United States Patent
Kirihara

(10) Patent No.: US 7,508,989 B2
(45) Date of Patent: Mar. 24, 2009

(54) IMAGE PROCESSING METHOD AND DEVICE FOR RESOLUTION CONVERSION OF COMPRESSED MOVING IMAGE DATA

(75) Inventor: Satoshi Kirihara, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 673 days.

(21) Appl. No.: 11/070,895

(22) Filed: Mar. 3, 2005

(65) Prior Publication Data

US 2005/0196054 A1 Sep. 8, 2005

(30) Foreign Application Priority Data

Mar. 5, 2004 (JP) .............................. 2004-063020
Feb. 16, 2005 (JP) .............................. 2005-039362

(51) Int. Cl.
G06K 9/00 (2006.01)
G06K 9/36 (2006.01)
G06K 9/46 (2006.01)
H04B 1/66 (2006.01)
H04N 7/12 (2006.01)
H04N 11/02 (2006.01)
H04N 11/04 (2006.01)
G06F 7/00 (2006.01)
G06F 15/00 (2006.01)

(52) U.S. Cl. ..................... 382/233; 382/166; 382/236; 375/240.25; 708/203

(58) Field of Classification Search ................. 382/233, 382/300, 166, 236; 358/525; 708/203, 290; 375/240.25
See application file for complete search history.

(56) References Cited

U.S. PATENT DOCUMENTS 5,754,710 A * 5/1998 Sekine et al. ............... 382/300
6,018,368 A * 1/2000 Kim et al. ............... 375/240.24
6,487,249 B2 * 11/2002 Kim et al. ............... 375/240.21
6,963,606 B1 * 11/2005 Yanagihara et al. .... 375/240.01
7,146,059 B1 * 12/2006 Durand et al. ............... 382/260
7,339,993 B1 * 3/2008 Brooks et al. .......... 375/240.26
2003/0001862 A1 * 1/2003 Chu et al. .................... 345/611
2003/0021345 A1 * 1/2003 Brusewitz .............. 375/240.18
2004/0126029 A1 * 7/2004 Sakuyama et al. .......... 382/240
2004/0213345 A1 * 10/2004 Holcomb et al. ........ 375/240.03

FOREIGN PATENT DOCUMENTS

JP          5-122681          5/1993

OTHER PUBLICATIONS

Vetro et al. ("On the motion compensation within a down-conversion decoder", Journal of Electronic Imaging 7(3), 616-627 (Jul. 1998).*

* cited by examiner

*Primary Examiner*—Yubin Hung
(74) *Attorney, Agent, or Firm*—Fitzpatrick, Cella, Harper & Scinto

(57) ABSTRACT

An image processing method comprising: a decoding processing step of applying decoding processing to a first kind of image data and a second kind of image data; a first resolution conversion processing step of applying first resolution conversion processing to the first kind of image data subjected to decoding processing; a parameter acquisition step of acquiring a parameter for resolution conversion of the second kind of image data subjected to decoding processing, on the basis of a result of the first resolution conversion processing; and a second resolution conversion processing step of applying a second resolution conversion processing to the second kind of image data subjected to decoding processing by using the acquired parameter.

8 Claims, 9 Drawing Sheets

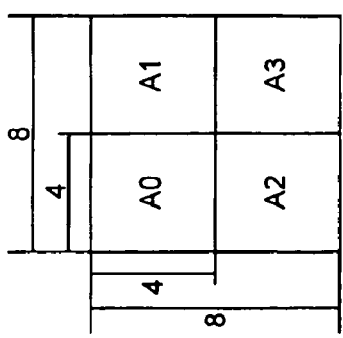
FIG. 9A HORIZONTAL INVERSION
FIG. 9B VERTICAL INVERSION
FIG. 9C HORIZONTAL+VERTICAL INVERSION

IMAGE PROCESSING METHOD AND DEVICE FOR RESOLUTION CONVERSION OF COMPRESSED MOVING IMAGE DATA

BACKGROUND OF THE INVENTION

1. Field of the Invention

The present invention relates to an image processing method and device for moving images and, more particularly, to an image processing method and device both of which continuously perform resolution conversion.

2. Description of the Related Art

A large number of resolution conversion techniques for still images have already been proposed. As general methods, there are image interpolation methods such as a nearest neighbor method, a bi-linear method and a bi-cubic method as well as frequency range interpolation methods such as DCT coefficient interpolation.

In general, resolution conversion of a moving image which is a continuation of still images is also performed by a method similar to any of the above-mentioned ones.

This resolution conversion needs to use a method such as a bi-cubic method which requires a large operation amount, in order to obtain a high-quality result. Such a method does not become a problem as long as it is executed on dedicated hardware, but if the method is executed by software processed by a general-purpose processor, the operation amount may become a problem.

Moving images are generally compressed by means of standards such as MPEG2 and MPEG4 because of other problems such as the problem of the capacity of a transmission path or a storage medium. These standards also require processing such as Huffman decoding or IDTC which consumes a large operation amount, and if decoding processing is performed by software, the operation amount may become a problem.

It has heretofore been general practice to perform the decoding processing and resolution conversion processing of compressed moving images by dedicated hardware because of the problem of the operation amount, but the number of cases where such processing is performed by software has increased with the recent improvement of processing technology.

When consideration is given to the case where software is used to perform decoding processing and further resolution conversion on a compressed moving image such as an MPEG image by software, the above-mentioned throughput problem becomes more remarkable. Namely, the calculations of both resolution conversion and decoding processing must be in time for real time display. However, the calculation amount necessary for the software decoding processing of pictures of MPEG generally differs for each of the pictures, so that there occurs the problem that the calculation capability of a processor becomes insufficient to perform accurate resolution conversion of a picture which consumes a large decoding calculation amount.

Accordingly, when decoding processing and resolution conversion of a moving image are to be performed by software, it is general practice to take into account a calculation amount for the decoding processing and perform simple resolution conversion which can be processed within the processing capability of a processor. However, in this method, it is difficult to use resolution conversion requiring a large calculation amount, and it is impossible to expect high image quality.

An invention which takes note of the calculation amount of decoding processing of moving images is disclosed in JP-A-5-122681. In this invention, if decoding processing exceeds the processing capability of a processor, the decoding processing is switched to a simple decoding method which can reduce a calculation amount while decreasing resolution. When a solution to the above-mentioned problems is considered from this invention, it is possible to readily presume a method which dynamically monitors the calculation amount of a system and, if the decoding calculation amount is too large to perform real-time processing with a resolution conversion method which is in use, switches the resolution conversion method to a simple resolution conversion method using a smaller calculation amount. However, this method has the problem that when the capability of a processor becomes insufficient, the resolution conversion processing methods are abruptly switched, so that there occurs the problem that the degradation of image quality becomes large.

SUMMARY OF THE INVENTION

An object of the invention is to solve the above-mentioned problems and reduce a total calculation amount as well as obtain a high-quality moving image during decoding processing of a compressed moving image and resolution conversion processing.

According to one aspect of the invention, there is provided an image processing method of converting compressed moving image data into moving image data made of a plurality of still images subjected to decoding processing and different in resolution from those before compression. The compressed moving image data includes a first kind of image data and a second kind of image data which requires a larger calculation amount than the first kind of image data during decoding processing of the compressed moving image data, and the image processing method includes:

a first decoding processing step of applying decoding processing to the first kind of image data;

a first resolution conversion processing step of applying first resolution conversion processing to the first kind of image data subjected to the decoding processing;

a parameter acquisition step of acquiring a parameter for resolution conversion of the second kind of image data before or after the decoding processing, on the basis of a first resolution converted image to which the first resolution conversion processing is applied; and a second resolution conversion processing step of applying second resolution conversion processing to the second kind of image data on the basis of the second kind of image data before or after the decoding processing and the acquired parameter.

According to another aspect of the invention, there is provided an image processing device which converts compressed moving image data into moving image data made of a plurality of still images subjected to decoding processing and different in resolution from those before compression. The compressed moving image data includes a first kind of image data and a second kind of image data which requires a larger calculation amount than the first kind of image data during decoding processing of the compressed moving image data, and the image processing device includes:

a first decoding processing section which applies decoding processing to the first kind of image data;

a first resolution conversion processing section which applies first resolution conversion processing to the first kind of image data subjected to the decoding processing;

a parameter acquisition section which acquires a parameter for resolution conversion of the second kind of image data before or after the decoding processing, on the basis of a first resolution converted image to which the first resolution conversion processing is applied; and a second resolution conversion processing section which applies second resolution conversion processing to the second kind of image data on the basis of the second kind of image data before or after the decoding processing and the acquired parameter.

The terms "larger calculation amount" and "smaller calculation amount" used herein indicate magnitude relationship which is obtained by comparing the calculation amount necessary for decoding processing of the first kind of image data with the calculation amount necessary for decoding processing of the second kind of image data on condition that the same image can be reproduced from the first and second kinds of image data by decoding processing.

According to the invention, it is possible to reduce a total calculation amount and obtain a high-quality moving image when decoding processing of a compressed moving image and resolution conversion processing are performed by software.

BRIEF DESCRIPTION OF THE DRAWINGS

FIG. 9, which includes FIGS. 9A-9C, is an explanatory view showing the first resolution conversion processing section shown in FIG. 7.

DETAILED DESCRIPTION OF THE PREFERRED EMBODIMENTS

First Embodiment

Figure 1:
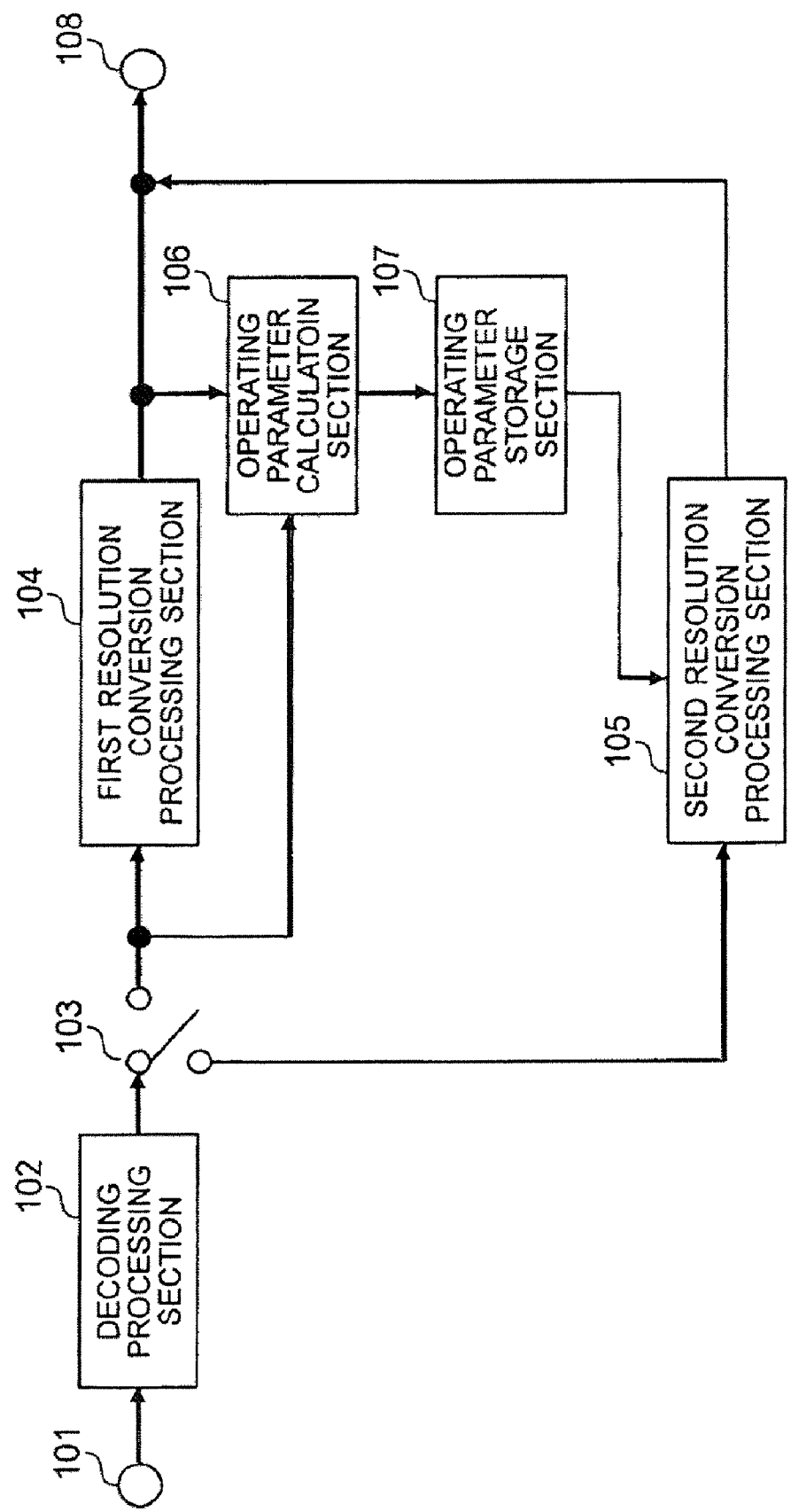
FIG. 1 is a block diagram showing a first embodiment of an image processing device according to the invention.
Figure 2:
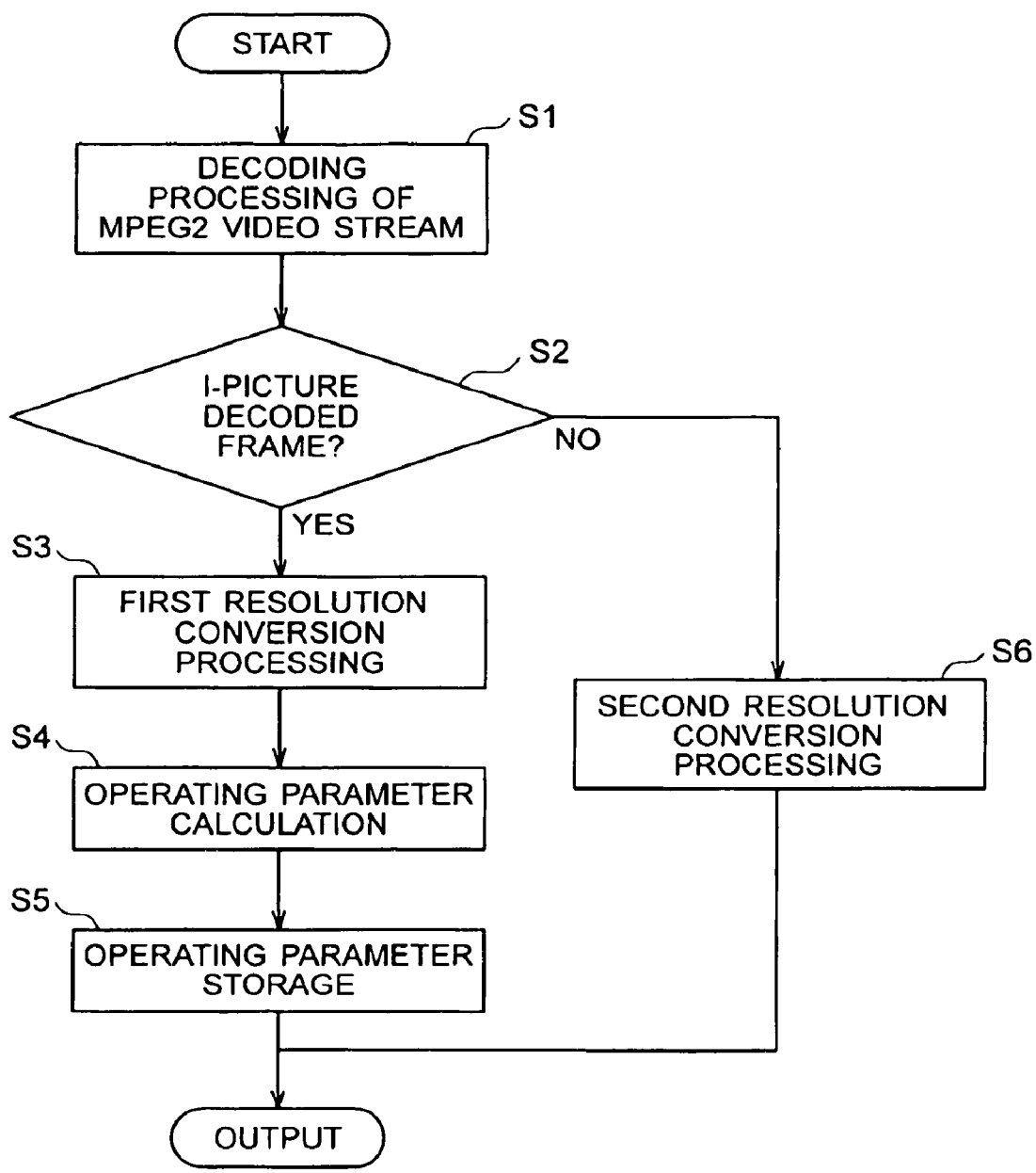
FIG. 2 is a flowchart showing a first embodiment of an image processing method according to the invention.

A first embodiment of the invention will be described below with reference to the accompanying drawings. FIG. 1 is a block diagram showing a first embodiment of an image processing device according to the invention. FIG. 2 is a flowchart showing a processing sequence of an image processing method to be executed in the image processing device.

In the preferred embodiments of the invention, an MPEG2 video stream which is inputted through an input section is subjected to decoding processing and then to resolution conversion, and the resultant moving image is outputted. In the first embodiment, as to the calculation amount of decoding processing of the MPEG2 video stream, for convenience of description, it is assumed that the decoding calculation amount of an I-picture is smaller, while the decoding calculation amount of each of P- and B-pictures is larger.

The image processing device shown in FIG. 1 includes an input section 101 which inputs an MPEG2 video stream, a decoding processing section 102 which performs decoding processing of MPEG2, a resolution conversion method selecting switch 103 which effects switching of processing next to be executed, according to the type of picture, a first resolution conversion processing section 104 which executes first resolution conversion using a larger amount of calculation, a second resolution conversion processing section 105 which executes second resolution conversion using a smaller amount of calculation by the use of parameters stored in an operating parameter storage section 107, an operating parameter calculation section 106 which calculates parameters to be used for the calculation of the second resolution conversion processing section 105, from an original image before resolution conversion and a result from the first resolution conversion processing section 104, the operating parameter storage section 107 which stores the parameters calculated by the operating parameter calculation section 106, and an output section 108 which outputs a moving image subjected to decoding processing and resolution conversion processing.

An MPEG2 video stream inputted through the input section 101 is subjected to decoding processing (first and second decoding processing) in the decoding processing section 102 (Step S1). In general, the calculation amount required for the decoding processing differs for MPEG2 frame compression methods. As mentioned above, in the first embodiment, it is assumed that the calculation amount of an I-picture is smaller, while the calculation amount of each of P- and B-pictures is larger. On the basis of this assumption, from among frames decoded by the decoding processing section 102, a frame decoded from an I-picture is sent to both the first resolution conversion processing section 104 and the operating parameter calculation section 106 through the resolution conversion method selecting switch 103, while frames respectively decoded from a P-picture and a B-picture are sent to the second resolution conversion processing section 105 through the switch 103 (Step S2).

In the following description, the frames decoded from the I-, P- and B-pictures are respectively referred to as the I-picture decoded frame, the P-picture decoded frame, and the B-picture decoded frame.

The first resolution conversion processing section 104 performs complicated high-quality resolution conversion using a larger calculation amount (Step S3). In the first embodiment, a bi-cubic method is used. The result is outputted from the output section 108, and is also sent to the operating parameter calculation section 106. The operating parameter calculation section 106 calculates parameters to be used in a second resolution conversion method to be applied to the P- and B-picture decoded frames, from the I-picture decoded frame and the high-quality resolution conversion result obtained from the resolution conversion performed by the first resolution conversion processing section 104 (Step S4).

The calculated operating parameters are stored in the operating parameter storage section (Step S5). The P- and B-decoded picture frames are inputted to the second resolution conversion processing section 105 through the switch 103, and the second resolution conversion processing section 105 performs resolution conversion using a smaller calculation amount, by the use of the parameters stored in the operating parameter storage section 107 (Step S6).

In general, image quality obtainable from resolution conversion using a smaller calculation amount is inferior to that obtained from a method using a larger calculation amount, but the above-mentioned image processing method performs resolution conversion using parameters extracted in resolution conversion using a larger calculation amount, whereby a resolution conversion result of high quality can be obtained in spite of a smaller calculation amount. The result is outputted from the output section 108.

The image processing method according to each of the preferred embodiments can be constructed as a program to be executed by a computer which function as an image processing device, and can be recorded on computer-readable recording media such as internal recording media like hard disks and semiconductor memories, or portable storage media such as CD-ROMs, flexible discs, DVD discs, magneto-optical discs and IC cards. (This construction can be similarly applied to other embodiments which will be described later.)

The operations of the first resolution conversion processing section 104 and the operating parameter calculation section 106 will be described below in detail.

The I-picture which is assumed to require a smaller amount of decoding calculation in the method according to the first embodiment is decoded in the decoding processing section 102, and is then subjected to resolution conversion in the first resolution conversion processing section 104. The first resolution conversion processing section 104 applies a resolution conversion method of high quality using a larger calculation amount. In the first embodiment, a bi-cubic method is applied.

The result obtained by applying the bi-cubic method to the I-picture decoded frame is sent to the output section 108 and is also sent to the operating parameter calculation section 106. The operating parameter calculation section 106 extracts operating parameters to be used in a resolution conversion method to be applied to the P- and B-picture decoded frames, by using the I-picture decoded frame and the resolution conversion result calculated by the first resolution conversion processing section 104.

In the first embodiment, resolution conversion based on a bi-linear method which is smaller in throughput than the bi-cubic method is applied to the P- and B-picture decoded frames. Since the bi-linear method is inferior in image quality to the bi-cubic method, when the resolution of the I-picture is to be converted by the bi-cubic method, information on pixel correlation is extracted so that pixel correlation information can be used in addition to normal linear interpolation of the bi-linear method. Accordingly, the image quality of the bi-linear method can be increased.

A pixel correlation information extraction method calculated by the operating parameter calculation section 106 will be described below in detail.

Figure 3:
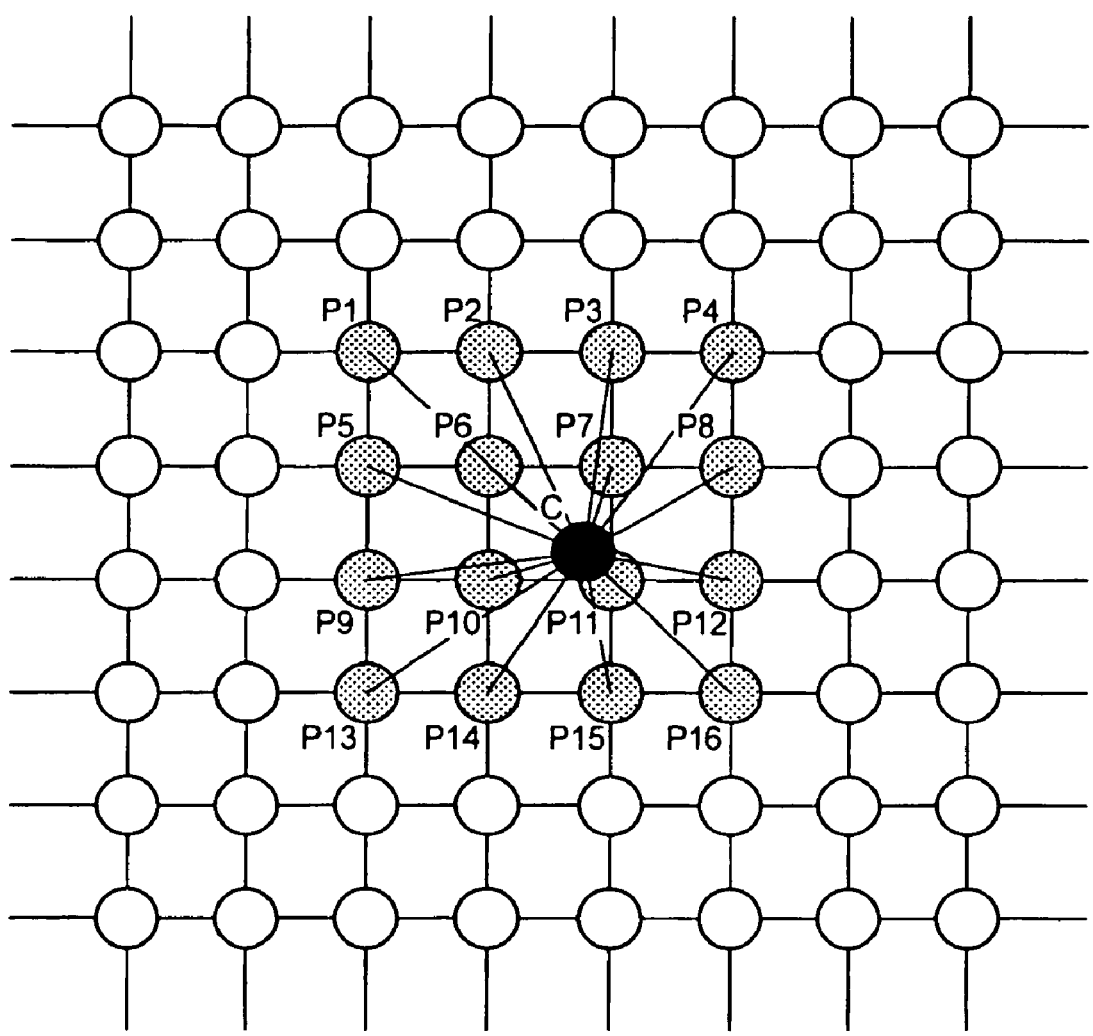
FIG. 3 is an explanatory view of the first resolution conversion processing section shown in FIG. 1.

FIG. 3 shows a pixel after resolution conversion interpolated by the bi-cubic method and pixels of an original image before resolution conversion. In FIG. 3, symbols P1 to P16 denote pixels of the original image, while symbol C denotes the interpolated pixel. In the bi-cubic method, the interpolated pixel C is calculated from RGB values of a total of sixteen points P1 to P16. In the following description, red color sub-pixel, green color sub-pixel and blue color sub-pixel are respectively referred to as R, G and B.

The operating parameter calculation section 106 extracts parameters to be used in the second resolution conversion method, from the original image (P1 to P16) and the interpolated pixel (C). For each of the P- and B-picture decoded frames, the operating parameter calculation section 106 uses the bi-linear method in order to calculate an interpolated pixel corresponding to the same position. Namely, the operating parameter calculation section 106 calculates the interpolated pixel C by using the pixels P6, P7, P10 and P11 which surround the interpolated pixel C. Accordingly, in order to increase the image quality of the bi-linear method, the operating parameter calculation section 106 finds an equation indicative of the relationship between the values of the surrounding pixels P6, P7, P10 and P11 and the value of the interpolated pixel C found by the bi-cubic method which is the first resolution conversion method:

$$x*P_{R6}*y*P_{R7}+z*P_{R10}+w*P_{R11}=P_{Rc} \quad (1)$$

Equation (1) relates to R sub-pixels. As to G and B sub-pixels, the operating parameter calculation section 106 finds operating parameters x, y, z and w by using a similar equation. To solve Equation (1), the operating parameter calculation section 106 groups interpolated pixels C each having the same sub-pixel values R6, R7, R10 and R11 within the I-picture decoded frame, and uses a least squares method. As a matter of course, the sum of x, y, z and w is 1. Although the operating parameter calculation section 106 may group the sub-pixel values R6, R7, R10 and R11 without modifying their numbers of bits, the operating parameter calculation section 106 may also be constructed to use only their high-order bits. In the first embodiment, the operating parameter calculation section 106 calculates the coefficients by using only four high-order bits.

The found coefficients of R, G and B may be stored and used without modification, but in the first embodiment, the coefficients of R, G and B are averaged as one parameter:

$$(x_{R6}+x_{G6}+x_{B6})/3=x$$

$$(y_{R7}+y_{G7}+y_{B7})/3=y$$

$$(z_{R10}+z_{G10}+z_{B10})/3=z$$

$$(w_{R11}+w_{G11}+w_{B11})/3=w \quad (2)$$

Figure 4:
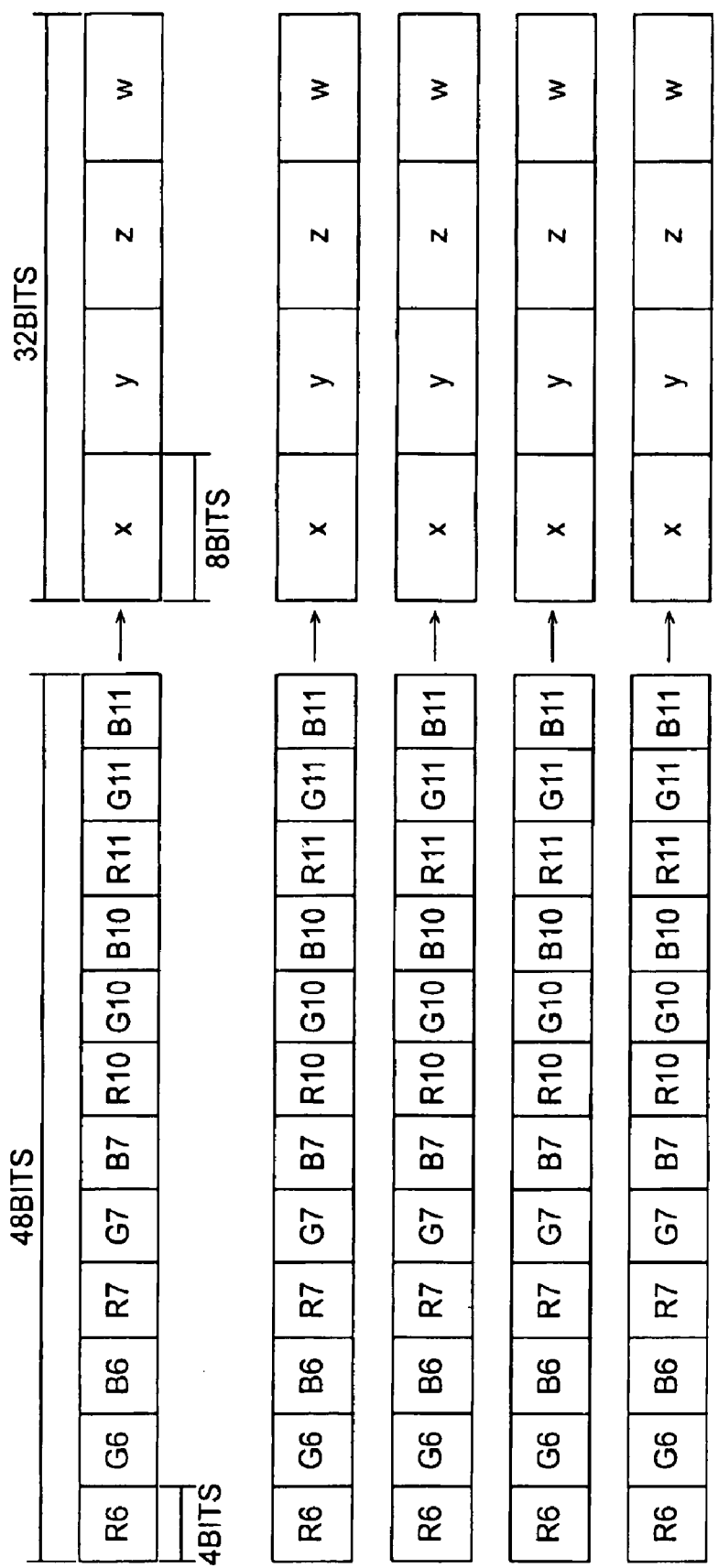
FIG. 4 is an explanatory view of the operating parameter storage section shown in FIG. 1.

The operating parameters indicating the correlation between the surrounding pixels and the interpolated pixel, which have been calculated with Equations (1) and (2) by the operating parameter calculation section 106, are stored in the operating parameter storage section 107 as pixel correlation coefficients. A schematic view of storage is shown in FIG. 4. The coefficients x, y, z and w which are to be used for the surrounding pixels (R6, G6, B6), (R7, G7, B7), (R10, G10, B10) and (R11, G11, B11) relative to the interpolated pixel C are stored. Only four high-order bits of each of the pixel values of the surrounding pixels are used. The number of bits to be stored is arbitrary, and in the first embodiment, it is assumed that 48 bits are stored as the total of four pixels, and 32 bits are stored as coefficients each having 4 bits. These operating parameters are set as one element, and the number of elements corresponding to the number of patterns of the surrounding pixels are stored.

The operation of the second resolution conversion processing section 105 will be described below.

The second resolution conversion processing section 105 applies a resolution conversion method using a smaller calculation amount than does the resolution conversion method of the first resolution conversion processing section 104. In the first embodiment, the second resolution conversion processing section 105 applies a method based on the bi-linear method. Specifically, the second resolution conversion processing section 105 multiplies distance coefficients to be used in the bi-linear method by the operating parameters indicative of the correlation between the surrounding pixels and the interpolated pixels, which are calculated by the operating parameter calculation section 106 and stored in the operating parameter storage section 107, and performs calculations by using the multiplied result as coefficients for the bi-linear method. Accordingly, as compared with general bi-linear methods, it is possible to improve image quality by the amount in which the result found by the bi-cubic method can be reflected.

Figure 5:
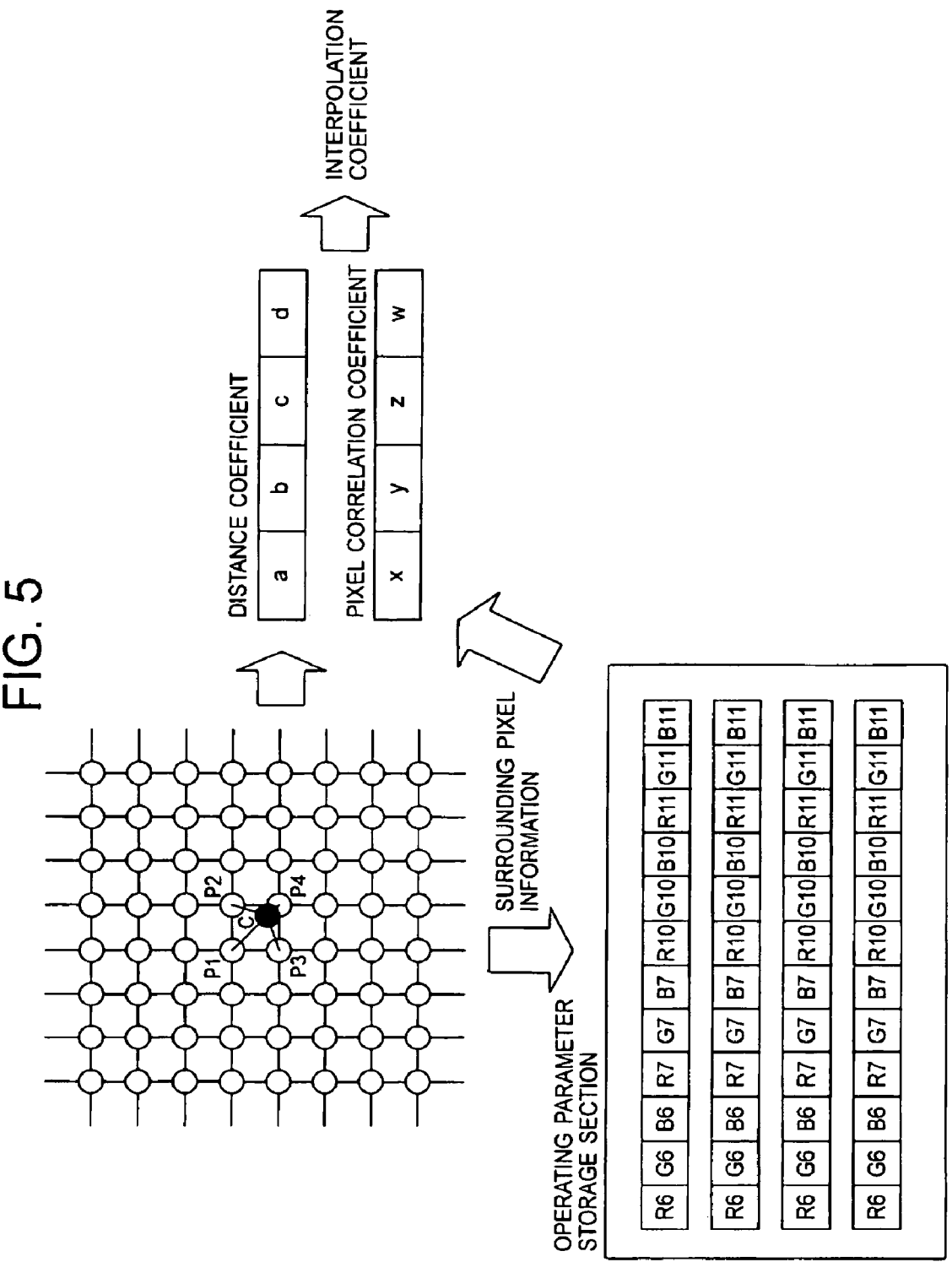
FIG. 5 is an explanatory view of the second resolution conversion processing section shown in FIG. 1.

FIG. 5 is a schematic view of the operation of the second resolution conversion processing section 105. First, the second resolution conversion processing section 105 calculates the coefficients (a, b, c and d) of the distance between the interpolated pixel C and the surrounding pixels P1, P2, P3 and P4 in order to perform general bi-linear interpolation. At the same time, the second resolution conversion processing section 105 inquires of the operating parameter storage section 107 48-bit surrounding pixel information in which four high-order bits of R, G and B of the surrounding pixels P1, P2, P3 and P4 are arranged. The operating parameter storage section 107 returns the pixel correlation coefficients (x, y, z and w) from the stored information to the second resolution conversion processing section 105 as to the inputted pixel correlation information. The second resolution conversion processing section 105 averages the distance coefficients and the pixel correlation coefficients and obtains interpolation coefficients, and performs resolution conversion:

$$C_R = \frac{(a+x)}{2} \times P1_R + \frac{(b+y)}{2} \times P2_R + \frac{(c+z)}{2} \times P3_R + \frac{(d+w)}{2} \times P4_R$$

$$C_G = \frac{(a+x)}{2} \times P1_G + \frac{(b+y)}{2} \times P2_G + \frac{(c+z)}{2} \times P3_G + \frac{(d+w)}{2} \times P4_G$$

$$C_B = \frac{(a+x)}{2} \times P1_B + \frac{(b+y)}{2} \times P2_B + \frac{(c+z)}{2} \times P3_B + \frac{(d+w)}{2} \times P4_B$$

(3)

As a matter of course, since an image to which the bi-cubic method is applied and an image to which the bi-linear method is applied are different images, it is not strictly accurate to reflect a bi-cubic result found from the I-picture decoded frame onto the P- and B-picture decoded frames. However, since the correlation of moving images is generally high in the time direction, this method can achieve a sufficiently high effect.

The first embodiment has been described on the assumption that the calculation amount of the decoding processing of the I-picture is smaller, while the calculation amount of the decoding processing of each of the P- and B-pictures is larger. However, the invention is not limited to this embodiment, and can be applied to any image processing method that performs different decoding processing in units of pictures.

Second Embodiment

Figure 6:
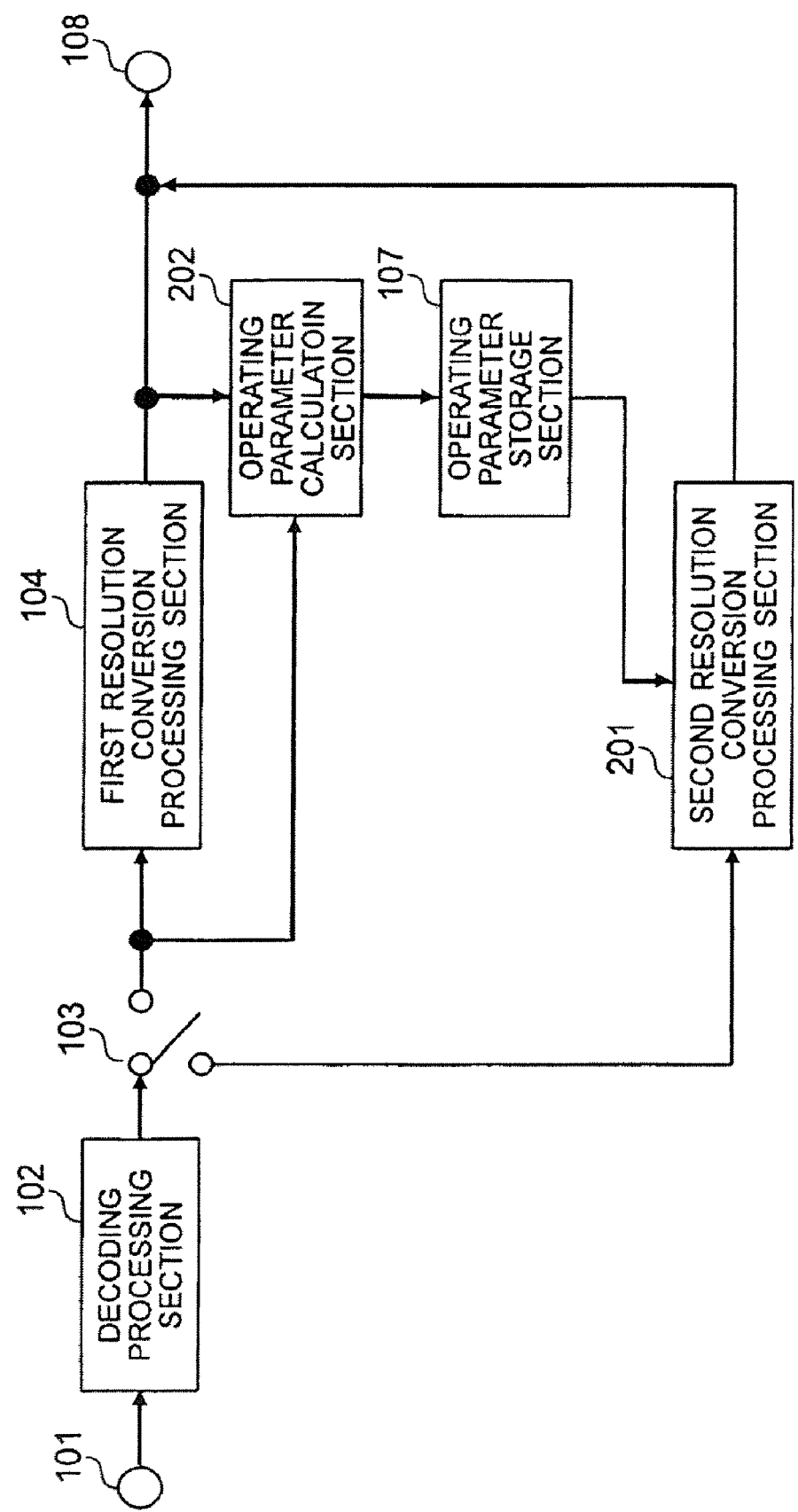
FIG. 6 is a block diagram showing a second embodiment of an image processing device according to the invention.

A second embodiment of the invention will be described below with reference to FIG. 6. FIG. 6 is a block diagram showing a second embodiment of an image processing device according to the invention.

In FIG. 6, the same reference numerals are used to denote blocks which perform the same operations as in the first embodiment, and the description of the same blocks is omitted.

In the second embodiment as well, in a manner similar to that of the first embodiment, an MPEG2 video stream which is inputted through an input section is subjected to decoding processing and then to resolution conversion, and the resultant moving image is outputted. Like in the first embodiment, as to the calculation amount of decoding processing of the MPEG2 video stream, it is assumed that the decoding calculation amount of the I-picture is smaller, while the decoding calculation amount of each of the P- and B-pictures is larger.

In FIG. 6, reference numeral 201 denotes a second resolution conversion processing section which executes second resolution conversion using a smaller amount of calculation by the use of parameters stored in the operating parameter storage section 107, and reference numeral 202 denotes an operating parameter calculation section which calculates parameters to be used for the calculation of the second resolution conversion processing section 201, from an original image before resolution conversion and a result from the first resolution conversion processing section 104.

The operation of the second embodiment differs from that of the first embodiment as to the operating parameter calculation method of the operating parameter calculation section 202 and the resolution conversion algorithm of the second resolution conversion processing section 201.

The operating parameter calculation section 202 and the second resolution conversion processing section 201 will be described below in detail in that order.

Like in the first embodiment, the first resolution conversion processing section 104 receives an I-picture decoded frame decoded by the decoding processing section 102 via the switch 103, and applies resolution conversion based on the bi-cubic method to the I-picture decoded frame.

The operating parameter calculation section 202 receives an original image and a resolution conversion result image from the first resolution conversion processing section 104, and calculates operating parameters to be used by the second resolution conversion processing section 201 during resolution conversion. In the second embodiment, since the second resolution conversion processing section 201 uses a method which is an improved nearest neighbor method, the operating parameter calculation section 202 calculates operating parameters for that method. Specifically, the correlation between an interpolated pixel of an I-picture decoded frame and pixel values arranged in four pixels surrounding the interpolated pixel on the original image is examined, and one pixel which has the highest correlation with each of the patterns of the surrounding four pixels is selected, and this pixel is selected as "the nearest" during resolution conversion of each of P- and B-picture decoded frames.

The operating method of the operating parameter calculation section 202 will be described below in more detail.

As to the interpolated pixel found by applying the bi-cubic method to the I-picture decoded frame and the surrounding four pixels, their inner product is calculated by comparing their RGB values to vectors, and the correlation between the interpolated pixel and the surrounding four pixels is calculated. A pixel having the largest correlation is selected as the nearest pixel irrespective of its position. As to each pixel of one I-picture decoded frame, the pattern of surrounding four pixels and the position of a pixel selected as "the nearest" are examined, and a position where the largest number of correlations are obtained is stored as "the nearest" for the surrounding pixel pattern. The pattern of the surrounding four pixels may be recognized with all pixel values, but may also be grouped to some extent. In the second embodiment of the invention, only four high-order bits of each pixel is used.

One example is as follows.

It is assumed that examination of all pixels of an I-picture shows that:

there are twenty pixels after resolution conversion each of which has the following surrounding four pixels:

TABLE 1

| P1 | P2 | P3 | P4 |
|---|---|---|---|
| (4, 0, 15) | (10, 10, 10) | (0, 0, 8) | (2, 7, 6) |

When the position of a pixel having the highest correlation is examined, the following result is obtained:

TABLE 2

| P1 | P2 | P3 | P4 |
|---|---|---|---|
| 12 pixels | 2 pixels | 0 pixels | 6 pixels |

The learning result is that as to the pattern of pixels shown in Table 1, P1 is selected as "the nearest".

This result is stored in the operating parameter storage section 107. The method of storage is similar to that used in the first embodiment, but in the second embodiment, a 4-bit value indicating any one of four numbers, 0(P1), 1(P2), 2(P3) and 3(P4) indicative of "the nearest" is stored from 48 bits which are the total of four high-order bits of RGB values of P1, P2, P3 and P4.

The operation of the second resolution conversion processing section 201 will be described below.

The second resolution conversion processing section 201 examines the pixel values of four pixels surrounding the interpolated pixel as to each of the P- and B-picture decoded frames. Like in the first embodiment, the second resolution conversion processing section 201 inquires of the operating parameter storage section 107 a 48-bit value in which four high-order bits of RGB values of the surrounding four pixels are arranged. The operating parameter storage section 107 returns a stored 4-bit parameter indicative of the "nearest" position from the inputted 48-bit surrounding pixel information to the second resolution conversion processing section 201. The second resolution conversion processing section 201 determines the "nearest" pixel position of P1 to P4 from the 4-bit returned value.

Accordingly, the probability that a pixel having high correlation can be selected is higher than those in general nearest neighbor methods, so that image quality can be improved with a far smaller throughput as to P- and B-picture decoded frames.

The second embodiment has been described on the assumption that the calculation amount of the decoding processing of the I-picture is smaller, while the calculation amount of the decoding processing of each of the P- and B-pictures is larger. However, the invention is not limited to this embodiment, and can be applied to any image processing method that performs different decoding processing in units of pictures.

Third Embodiment

Figure 7:
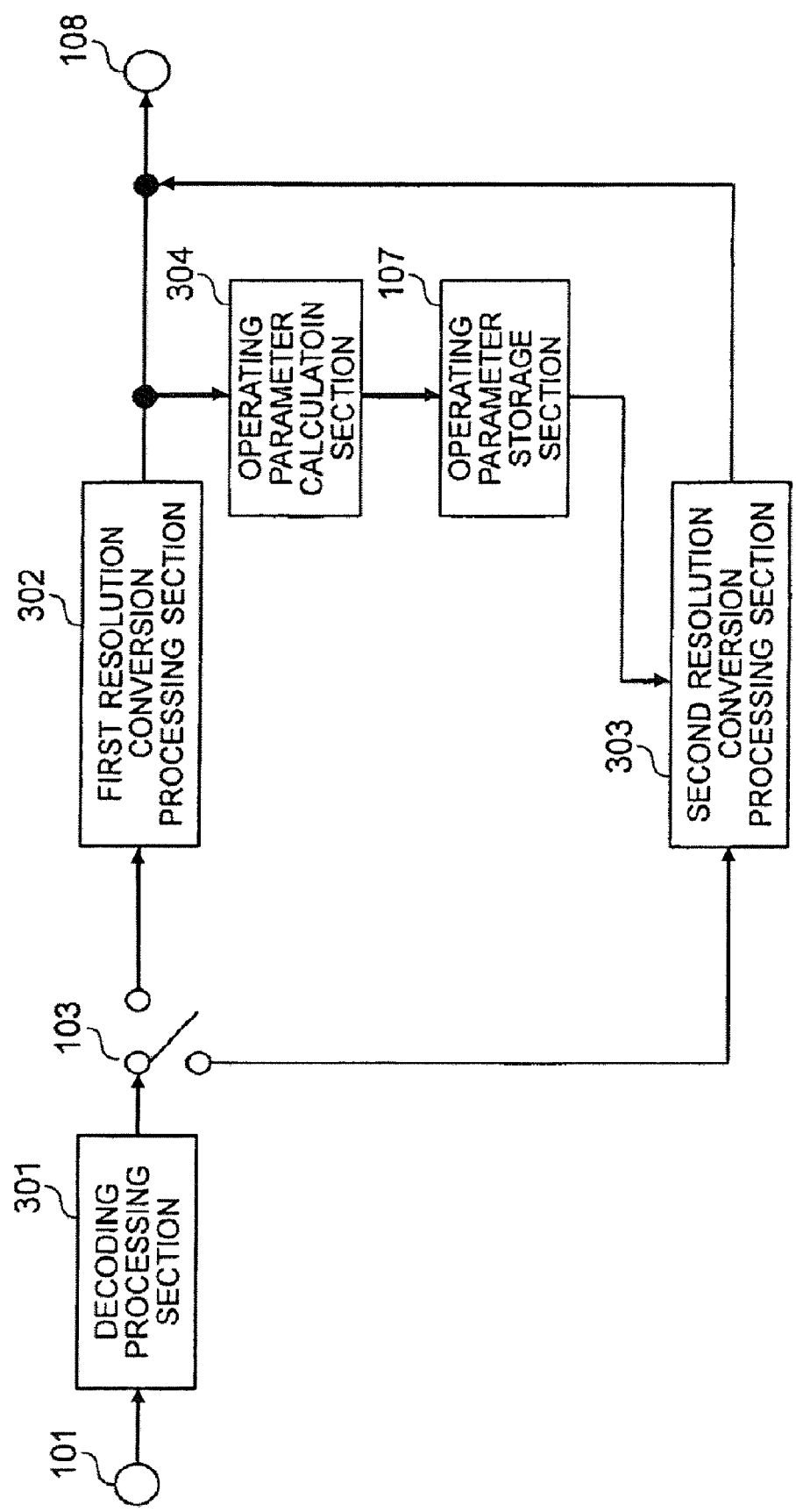
FIG. 7 is a block diagram showing a third embodiment of an image processing device according to the invention.
Figure 8:
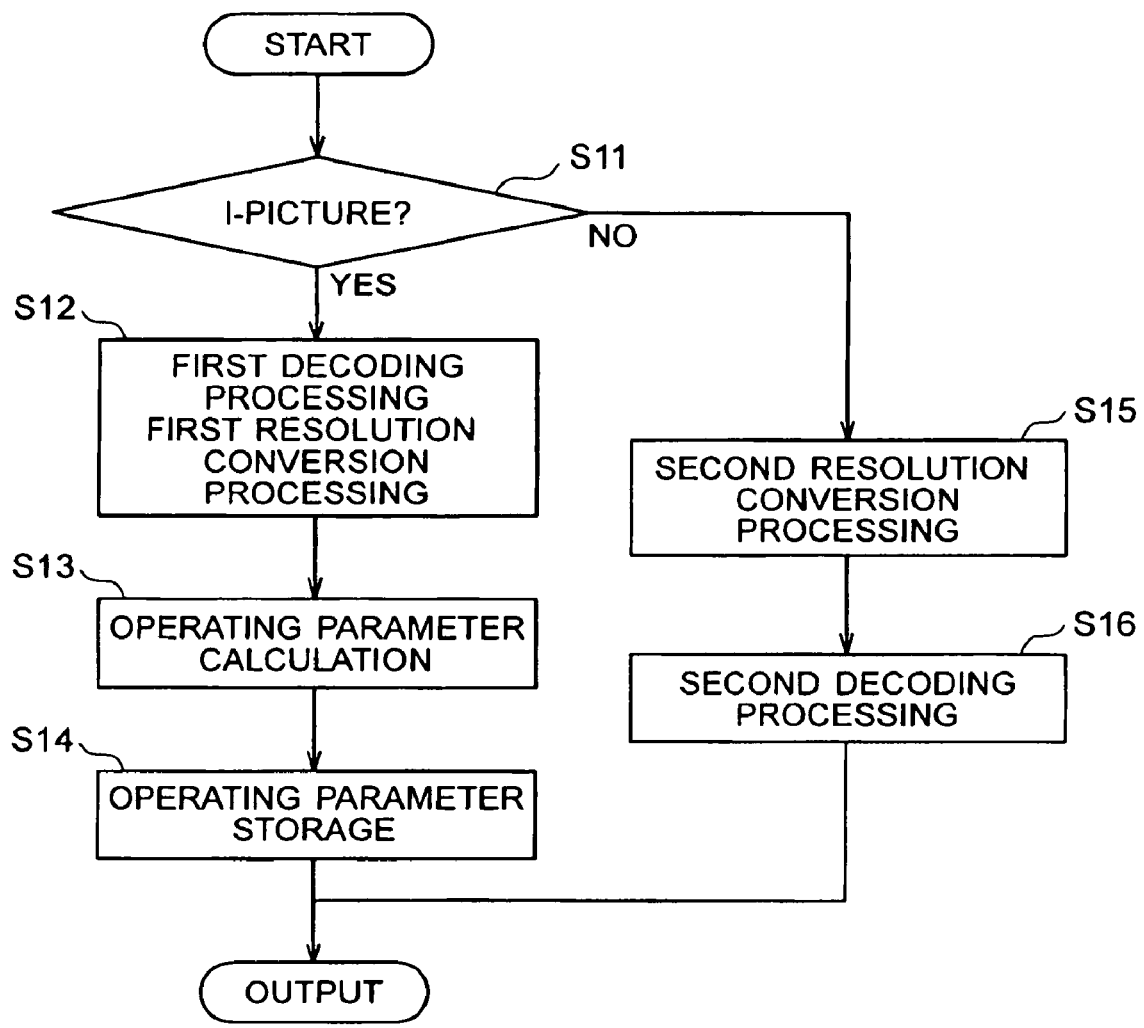
FIG. 8 is a flowchart showing a third embodiment of an image processing method according to the invention.

A third embodiment of the invention will be described below with reference to FIG. 7. FIG. 7 shows a block diagram showing a third embodiment of an image processing device according to the invention. FIG. 8 shows an explanatory flowchart of a processing sequence of an image processing method to be executed by the image processing device.

In FIG. 7 as well, the same reference numerals are used to denote blocks which perform the same operations as in the first embodiment, and the description of the same blocks is omitted.

In the third embodiment as well, in a manner similar to that of the first embodiment, an MPEG2 video stream which is inputted through an input section is subjected to decoding processing and then to resolution conversion, and the resultant moving image is outputted. Like in the first embodiment, as to the calculation amount of decoding processing of the MPEG2 video stream, it is assumed that the decoding calculation amount of the I-picture is smaller, while the decoding calculation amount of each of the P- and B-pictures is larger. In addition, the following description is applied to a magnification of 2× for the sake of simplicity of description, but can be applied to all resolution conversion methods having a magnification of the nth power of 2 (n is a natural number).

In FIG. 7, reference numeral 301 denotes a decoding processing section which performs decoding processing of a compressed stream except pictures, reference numeral 302 denotes a first resolution conversion processing section which receives a compressed picture and performs decoding processing and resolution conversion processing, reference numeral 303 denotes a second resolution conversion processing section which executes decoding of a compressed picture and at the same time second resolution conversion using a smaller amount of calculation by the use of parameters stored in the operating parameter storage section 107, and reference numeral 304 denotes an operating parameter calculation section which calculates parameters to be used for the calculation of the second resolution conversion processing section 303, from a result from the first resolution conversion processing section 302.

The operation of the third embodiment differs from that of the first embodiment in the following respects: the fact that the first resolution conversion processing section 302 performs resolution conversion at the same time as decoding of a compressed picture; the operating parameter calculation method of the operating parameter calculation section 304; the fact that the second resolution conversion processing section 303 performs resolution conversion at the same time as decoding of a compressed picture; and the resolution conversion algorithm of the second resolution conversion processing section 303.

Through the resolution conversion method selecting switch 103, a compressed I-picture is sent to the first resolution conversion processing section 302, while compressed P- and B-pictures are sent to the second resolution conversion processing section 303 (Step S11).

The first resolution conversion processing section 302 receives the compressed I-picture via the switch 103, and performs decoding processing (first decoding processing) and also applied resolution conversion using a bi-cubic method like in the first embodiment (Step S12).

The operating parameter calculation section 304 receives the resolution conversion result image from the first resolution conversion processing section 302, and calculates operating parameters to be used by the second resolution conversion processing section 303 during resolution conversion (Step S13). In the third embodiment, since resolution conversion based on DCT coefficient interpolation is used in the second resolution conversion processing section 303, the operating parameter calculation section 304 calculates operating parameters for that resolution conversion. Specifically, the operating parameter calculation section 304 performs DCT conversion of 16×16 as to an I-picture decoded frame, and analyzes the obtained DCT coefficient and calculates a correlation between an 8×8 region of a low frequency range and a high frequency range.

The operating parameter calculation method will be described below in detail.

In general, it is known that in the case where resolution conversion into 8×8 is performed with a 4×4 DCT coefficient A0, a coefficient A1 corresponding to the high frequency range of a decoded image can be correctly restored by folding back the coefficient A0 in the horizontal direction as shown in FIG. 9A. As to a coefficient A2, the DCT coefficient of the high frequency range can be restored by folding back the coefficient A0 in the vertical direction as shown in FIG. 9B, and as to a coefficient A3, the DCT coefficient of the high frequency range can be restored by folding back the coefficient A0 in the horizontal and vertical directions as shown in FIG. 9C. The actually obtained DCT coefficients and the coefficients A1 to A3 obtained by folding back the coefficient A0 are compared to find correction coefficients.

Correction coefficients which satisfy the following equation (4) are calculated on all 16×16 DCT blocks of one picture, and an operating parameter is calculated by averaging the correction coefficients:

$$\text{actual DTC coefficient} = \text{correction coefficient} \times \text{folded coefficient} \quad (4)$$

The operating parameter calculated in this manner is stored in the operating parameter storage section 107. In the third embodiment, the parameter stored in the operating parameter storage section 107 is a single correction parameter. The number of bits is arbitrary (S14).

The second resolution conversion processing section 303 receives the compressed P- and B-pictures and magnifies an 8×8 DCT coefficient contained in the compressed stream to 16×16 during decoding processing, and as to the high frequency range, after having folded back an 8×8 coefficient, multiplies the coefficients by a correction coefficient obtained as the learning result, thereby performing resolution conversion (Step S15). Decoding processing (second decoding processing) is performed by performing inverse DCT on that 16×16 DCT block (Step S16), whereby it is possible to obtain a high-quality magnified image onto which the result of the bi-cubic method applied to the I-picture decoded frame is reflected.

The third embodiment has been described on the assumption that the calculation amount of the decoding processing of the I-picture is smaller, while the calculation amount of the decoding processing of each of the P- and B-pictures is larger. However, the invention is not limited to this embodiment, and can be applied to any image processing method that performs different decoding processing in units of pictures.

This application claims priority from Japanese Patent Application No. 2004-63020 filed Mar. 5, 2004, and Japanese Patent Application No. 2005-39362 filed Feb. 16, 2005, which are hereby incorporated by reference herein.

What is claimed is:

1. An image processing method for converting compressed moving image data into moving image data made of a plurality of still images subjected to decoding processing and different in resolution from those before compression, the compressed moving image data including a first kind of image data and a second kind of image data which requires a larger calculation amount than the first kind of image data during decoding processing, the image processing method comprising:

using a computer to perform the following:

a decoding processing step of applying decoding processing to the first kind of image data and the second kind of image data;

a first resolution conversion processing step of applying first resolution conversion processing to the first kind of image data subjected to decoding processing;

a parameter acquisition step of acquiring a parameter for resolution conversion of the second kind of image data subjected to decoding processing, on the basis of a result of the first resolution conversion processing; and a second resolution conversion processing step of applying second resolution conversion processing to the second kind of image data subjected to decoding processing by using the acquired parameter.

2. An image processing method according to claim 1, wherein the first resolution conversion processing is resolution conversion processing based on a bi-cubic method, wherein the second resolution conversion processing is resolution conversion processing based on a bi-linear method, wherein an interpolation coefficient is determined by averaging: (a) a correlation coefficient, calculated in the bi-cubic method, indicating a correlation between an interpolated pixel and surrounding pixels of the first kind of image data subjected to decoding processing; and (b) a distance coefficient, calculated in the bi-linear method, between an interpolated pixel and surrounding pixels of the second kind of image data subjected to decoding processing, and wherein the second resolution conversion processing is applied to the second kind of image data subjected to decoding processing by using the interpolation coefficient.

3. An image processing method according to claim 1, wherein the first resolution conversion processing is resolution conversion processing based on a bi-cubic method, wherein the second resolution conversion processing is resolution conversion processing based on a nearest neighbor method, wherein a pixel having the largest correlation among a plurality of surrounding pixels is determined on the basis of correlation information, calculated as an inner product, between an interpolated pixel and each of the plurality of surrounding pixels of the first kind of image data subjected to decoding processing, and wherein the second resolution conversion processing is applied to the second kind of image data subjected to decoding processing by using information on the determined pixel having the largest correlation.

4. An image processing method according to claim 1, wherein the first kind of image data is an I-picture type of image data, while the second kind of image data is a P- or B-picture type of image data.

5. An image processing method for converting compressed moving image data into moving image data made of a plurality of still images subjected to decoding processing and different in resolution from those before compression, the compressed moving image data including a first kind of image data and a second kind of image data which requires a larger calculation amount than the first kind of image data during decoding processing, the image processing method comprising:

using a computer to perform the following:

a first processing step of applying first resolution conversion processing to the first kind of image data and then applying decoding processing to the first kind of image data;

a parameter acquisition step of acquiring a parameter for resolution conversion of the second kind of image data on the basis of a result of the first resolution conversion processing; and a second processing step of applying second resolution conversion processing to the second kind of image data by using the acquired parameter and then applying decoding processing to the second kind of image data.

6. An image processing method according to claim 5, wherein the first resolution conversion processing is resolution conversion processing based on a bi-cubic method, wherein the second resolution conversion processing is resolution conversion processing using a DCT coefficient in a frequency range, wherein a correction parameter indicating a correlation between a DCT coefficient region of low frequency range and a DCT coefficient region of high frequency range is calculated with respect to the first kind of image data subjected to the first resolution conversion, wherein a DCT coefficient region of high frequency range is calculated from a DCT coefficient region of low frequency range with respect to the second kind of image data, and wherein the second resolution conversion processing is performed by using the correction parameter and the calculated DCT coefficient region of high frequency range with respect to the second kind of image data.

7. An image processing device for converting compressed moving image data into moving image data made of a plurality of still images subjected to decoding processing and different in resolution from those before compression, the compressed moving image data including a first kind of image data and a second kind of image data which requires a larger calculation amount than the first kind of image data during decoding processing, the image processing device comprising:

a decoding processing section which applies decoding processing to the first kind of image data and the second kind of image data;

a first resolution conversion processing section which applies first resolution conversion processing to the first kind of image data subjected to the decoding processing;

a parameter acquisition section which acquires a parameter for resolution conversion of the second kind of image data subjected to decoding processing, on the basis of a result of the first resolution conversion processing; and a second resolution conversion processing section which applies second resolution conversion processing to the second kind of image data subjected to decoding processing by using the acquired parameter.

8. An image processing device for converting compressed moving image data into moving image data made of a plurality of still images subjected to decoding processing and different in resolution from those before compression, the compressed moving image data including a first kind of image data and a second kind of image data which requires a larger calculation amount than the first kind of image data during decoding processing, the image processing device comprising:

a first processing section which applies first resolution conversion processing to the first kind of image data and then applies decoding processing to the first kind of image data;

a parameter acquisition section which acquires a parameter for resolution conversion of the second kind of image data on the basis of a result of the first resolution conversion processing; and a second processing section which applies second resolution conversion processing to the second kind of image data by using the acquired parameter and then applies decoding processing to the second kind of image data.

* * * * *